United States Patent [19]

Konishi et al.

[11] 4,400,498
[45] Aug. 23, 1983

[54] THERMOPLASTIC POLYURETHANE RESINS

[75] Inventors: Shin Konishi; Mitsuhiro Yoshida; Masatake Katagiri, all of Yokohama; Masashi Somezawa, Sendai; Yoshinobu Ninomiya, Miyagi; Akira Hashimoto, Tagajyo, all of Japan

[73] Assignees: Sony Corporation; Nippon Polyurethane Industry Co., Ltd., both of Tokyo, Japan

[21] Appl. No.: 334,254

[22] Filed: Dec. 24, 1981

[30] Foreign Application Priority Data

Dec. 29, 1980 [JP] Japan .............................. 55-188182

[51] Int. Cl.³ ...................... C08G 69/00; C08G 69/08; C08G 69/14
[52] U.S. Cl. ........................................ 528/60; 528/65; 528/76; 528/80; 528/83; 528/905
[58] Field of Search ........................................ 528/60

[56] References Cited

U.S. PATENT DOCUMENTS

| | | | |
|---|---|---|---|
| 3,009,765 | 2/1959 | Slovin et al. | 528/60 |
| 3,012,987 | 12/1961 | Ansul et al. | 528/60 |
| 3,049,516 | 8/1962 | Damusis | 528/60 |
| 3,165,566 | 1/1965 | Murphy et al. | 528/60 |
| 3,386,962 | 6/1968 | Damusis | 528/60 |
| 3,457,225 | 7/1969 | Damusis | 528/60 |
| 3,595,838 | 7/1971 | Ogino | 528/60 |
| 3,663,513 | 5/1972 | Kazama et al. | 528/60 |
| 3,691,117 | 9/1972 | Messerly | 528/60 |

Primary Examiner—John Kight, III
Assistant Examiner—Marvin L. Moore
Attorney, Agent, or Firm—Hill, Van Santen, Steadman & Simpson

[57] ABSTRACT

The thermoplastic polyurethane resin having a molecular weight larger than about 5,000 is obtainable by the polyaddition of a long chain diol (A) having a molecular weight ranging from about 500 to 3,000, an organic diisocyanate (C) and a short chain triol (D) having a molecular weight lower than about 500 and specified structures and, as desired, a short chain diol (B) having a molecular weight ranging from about 50 to 500, in specified ratios.

The thermoplastic polyurethane resin provides particularly enhanced heat resistance and solvent resistance with improved dispersibility of a pigment or the like and other resins and favorable compatibility with a solvent or the like.

22 Claims, 1 Drawing Figure

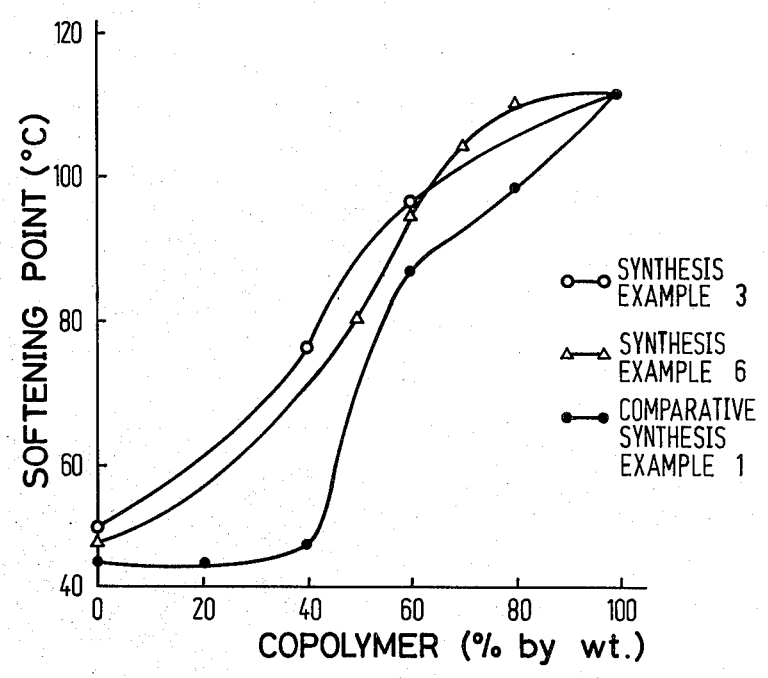

THERMOPLASTIC POLYURETHANE RESINS

BACKGROUND OF THE INVENTION

1. Field of the Invention

The present invention relates to a thermoplastic polyurethane resin. The thermoplastic polyurethane resin possesses a hydroxyl group or hydroxyl groups at a side portion or side portions thereof so that the curing through the reactivity of such hydroxyl group or groups in a three-dimensional network structure can provide improved thermal resistant and solvent-resistant properties which are useful for adhesives, coating agents and binders.

Hydrophilic properties of the hydroxyl groups present at the side portions of a polyurethane resin or the tertiary amino groups present in the main molecular chain thereof can improve dispersibility of a pigment and an inorganic filler. Those polar groups also can serve as improving compatibility with other resins so that the thermoplastic polyurethane resins having such polar groups are useful particularly as binders, coatings and so on.

2. Brief Description of the Prior Art

Urethane resins are extensively used as adhesives, artificial hides or skins, paints, elastomers, coatings and binders. Various modes of employing the urethane resins are known. They can be roughly classified into the following groups: for example, the two-pack method in which a polyisocyanate is subjected to a reaction for chain prolongation or propagation or a cross-linking reaction for a network formation with an active hydrogen compound such as a low molecular weight polyol and, as necessary, a triol and so on; a moisture-curing one-can method in which a urethane prepolymer retaining therein a portion of the isocyanate groups formed by the reaction of a polyol with a polyisocyanate is reacted with moisture in the air; a block isocyanate one-can method in which a polyol is employed as a mixture with a polyisocyanate (block isocyanate) masked with a blocking agent; and the thermoplastic polyurethane method in which a linear high molecular weight polyurethane or a so-called thermoplastic polyurethane resin is used.

The two-pack method can provide a three-dimensional network structure after curing so that it can give favorable effects on various properties. The method, however, involves the mixing of two liquids which are both low molecular weight compounds so that the method has disadvantages that there is a limitation on operability in respect of pot life and so on and that an initial physical property is weak until the curing proceeds to some degree. As a product obtainable by the two-pack method has an initial tackiness in many cases, the step of winding it on itself or on something else in roll immediately after coating or the step of recoating on a previous coat may cause problems with drying and blocking.

The one-can method using the block isocyanate presents disadvantages that it requires high temperatures for curing so as to cause the blocking agent to be eliminated and that, where the blocking agent remains partially in the resulting resin, the agent will give an adverse effect on physical properties of the resin and cause an environmental pollution in association with the scattering of the agent. These disadvantages permit limited use of the resulting resin.

The method of curing in moisture may cause a problem with curing because the curing varies to a great extent with ambient conditions such as moisture, temperature and so on and because the generation of carbon dioxide may become a cause of bubbles. This problem also causes the resulting resin to permit a limited use for the resulting resin.

Different from those methods as hereinabove referred to, the thermoplastic polyurethane method can present advantages that the drying property for forming a film by the evaporation of a solvent immediately after the coating is favorable because of the use of a high molecular polyurethane resin dissolved in the solvent and that a pot life required for operation of the solution is unlimited. Conventional thermoplastic polyurethane method, however, presents the drawback that, as the film resulting from conventional thermoplastic polyurethane resin is not in a network structure, the film becomes dissolved or swollen in a particular solvent, whereby the film is rendered poor in solvent resistance. The method, however, requires improvement because the resin resulting from such polyurethane resin melts at temperatures above the softening point thereof and because it is poorer in heat resistance than crosslinked resins obtainable by methods other than such thermoplastic polyurethane method.

Thermoplastic polyurethane resins containing a terminal hydroxyl group or terminal hydroxyl groups, which may be employed particularly for adhesives, coating agents, binders for magnetic tapes and inks, and so on, are used in the form of a solution in a solvent such as a ketone, e.g., acetone, ethyl acetate, butyl acetate, methyl ethyl ketone, methyl isobutyl ketone or the like; an aromatic hydrocarbon, e.g., toluene, isophorone or the like; an alcohol, e.g., isopropyl alcohol or the like; or a mixture thereof. Such thermoplastic polyurethane resins, however, have the drawbacks that a solubility thereof in the solvent as hereinabove referred to becomes poorer in instances where the concentration of urethane groups in the polyurethane resin is rendered high by increasing a ratio of a low molecular weight diol in the resulting polyurethane resin in order to provide enhanced heat resistance and solvent resistance of the resulting thermoplastic polyurethane resin. Accordingly, in this case, the use of a solvent having a strong action to solubilize the polyurethane resin and a high polarity is required. Representatives of such solvent may be enumerated by dimethyl formamide, tetrahydrofuran or the like. Such solvent, however, may cause the disadvantage that it will corrode surface portions of a base film, a coated object or the like on which the product containing such solvent is brought into contact, whereby wrinkles or crinkles are partially caused or, in some cases, the portions may become dissolved. Therefore, there is a limitation on improvement by increasing the concentration of the urethane groups in the resulting thermoplastic polyurethane resin to be used.

As a process for improving, in particular, heat resistance and solvent resistance of a thermoplastic polyurethane resin, there is known a procedure in which a polyisocyanate such as a commercially available product "Coronate L" (manufactured and sold by Nippon Polyurethane Industry Co., Ltd.) is added to the thermoplastic polyurethane resin containing a terminal hydroxyl group or terminal hydroxyl groups and then the resulting mixture is subjected to chain prolongation or propagation and crosslinking reactions. In this process, both the hydroxyl groups present at the terminals of the thermoplastic polyurethane resin chain and a urethane bond or bonds present in the molecular chain thereof are allowed to react with the polyisocyanate. In particular, the reaction of the urethane bond with the isocyanate group of the polyisocyanate, which is called an allophanate reaction, that is, a reaction for forming the allophanate bond, requires high temperatures and it cannot provide a sufficient network structure in the resulting polyurethane resin where the resin is used to form a coating.

Where conventional thermoplastic polyurethane resins are used for coating agents, binders for magnetic tapes and inks and the like, in which an inorganic filler or the like is dispersed or filled therein, workability at the time of coating, such as drying property, recoatability, curing velocity, liquid properties and the like is of great significance, in addition to various physical properties such as durability, weathering, adhesion to a base material and the like. On the top of those characteristic properties, thermoplastic polyurethane resins have been demanded to have desirable properties in respect of segregation, sedimentation, gloss on the surface of a cured product and the like. In particular, binders for magnetic tapes further require that the thermoplastic polyurethane resin to be used can provide favorable electromagnetic performance and properties resulting from the dispersibility of a pigment in the polyurethane resin. Conventional thermoplastic polyurethane resins, however, have the drawback that their action to disperse a pigment, an inorganic filler or the like is particularly poor so that thermoplastic polyurethane resins having particularly improved dispersion properties have been desired.

As a polyurethane resin possesses elastomeric properties and a resistance to wear to such an extent as other resins cannot provide, characteristic properties may be expected when such polyurethane resin is blended with the other resins. Conventional thermoplastic polyurethane resins, however, are less satisfactory in compatibility with the other resins.

As a method of improving the heat resistance and the solvent resistance of a thermoplastic polyurethane resin while retaining favorable drying properties and flexibility originating from the polyurethane resin, there is known a method of providing a three-dimensional network structure by subjecting the resin to crosslinking between the polyurethane molecule chains within a range in which the flexibility of the resulting resin is not impaired. This method permits the formation of a three-dimensional network structure in the resulting polyurethane resin by adding a curing agent likely to be reactive with a functional group to the thermoplastic polyurethane resin which has at least two functional groups which can be reacted with the curing agent.

Since the pigment, the inorganic filler or the like to be contained in coating agents, various binders and so on has adsorption water and/or chemically bonded water on its surface even when dried to a sufficient extent, consequently it shows a hydrophilic property and compatibility with a compound having a hydroxyl group, a carboxyl group, a sulfone group, a tertiary amino group, a quaternary amino group or the like. As a result, a dispersibility of the coating agents, various binders or the like is improved by adsorption through the aid of those groups.

OBJECTS AND SUMMARY OF THE INVENTION

It is an object of the present invention is to provide a thermoplastic polyurethane resin having improved heat resistance and solvent resistance.

It is another object of the present invention to provide a thermoplastic polyurethane resin further having improved dispersibility of a pigment, an inorganic filler or the like and compatibility with other resins.

It is a further object of the present invention to provide a thermoplastic polyurethane resin likely to be crosslinked to form a three-dimensional network structure.

In accordance with an aspect of the present invention, a thermoplastic polyurethane resin is one obtainable by the polyaddition of a long chain diol (A) having a molecular weight ranging from about 500 to 3,000, an organic diisocyanate (C) and a short chain triol (D) having a molecular weight smaller than 500 and the structures as represented by formulas as will be described hereinafter and, as desired, a short chain diol (B) having a molecular weight ranging from about 50 to 500, in ratios as will be defined hereinafter.

As a result of extensive research on thermoplastic polyurethane resins, it has been found that the polyaddition reaction of the short chain triol (D) having a specified structure as will be described hereinafter, as one component of the thermoplastic polyurethane resin having a hydroxy group or hydroxyl groups at its terminal or terminals, with the long chain diol and the organic diisocyanate and, as desired, the short chain diol within a specified range can permit a selective reaction to provide a thermoplastic polyurethane resin having a hydroxyl group or hydroxyl groups at its terminal or terminals, which has additionally at least one hydroxyl group in the side chain thereof and, in instances where the nitrogenous short chain triol as will be described hereinafter is used, which has at least one hydroxyl group in the side chain thereof and at least one tertiary amino group in the main chain thereof without causing gellation during manufacture regardless of the use of the triol that has three functional groups as a raw material. The present invention has been accomplished on the basis of this finding that such thermoplastic polyurethane resin can be readily cured with a polyisocyanate or the like and that it can provide improvement in properties that are lacking to a great extent in conventional thermoplastic polyurethane resin. The thermoplastic polyurethane resin according to the present invention possesses a highly enhanced heat resistance and solvent resistance and highly improved dispersibility with a pigment, an inorganic filler and any other additive and favorable compatibility with other resins with the aid of the hydroxyl group or hydroxyl groups present in the side chain thereof and/or the hydroxyl group or groups and the tertiary amino group or groups present in the main chain thereof.

BRIEF DESCRIPTION OF THE DRAWING

The FIGURE is a graph illustrating a relationship of the softening points of the polyurethane resins vs. vinyl chloride-vinyl acetate-vinyl alcohol copolymer ("VAGH").

DESCRIPTION OF THE PREFERRED EMBODIMENTS

The thermoplastic polyurethane resin in accordance with the present invention comprises a combination of units represented by formulas (I):

$$\mathrm{\!-\!(W\!-\!OC\!-\!NH\!-\!X\!-\!NH\!-\!CO\!)_{\overline{n_1}}\!-\!} \quad \text{(a)}$$
$$\qquad\ \ \|\qquad\qquad\quad\ \ \|$$
$$\qquad\ \ O\qquad\qquad\quad\ \ O$$

$$\mathrm{\!-\!(Y\!-\!OC\!-\!NH\!-\!X\!-\!NH\!-\!CO\!)_{\overline{n_2}}\!-\!} \quad \text{(b)}$$
$$\quad\ |\ \ \|\qquad\qquad\quad\ \ \|$$
$$\quad\ OH\ O\qquad\qquad\quad\ O$$

$$\mathrm{\!-\!(Z\!-\!OC\!-\!NH\!-\!X\!-\!NH\!-\!CO\!)_{\overline{n_3}}\!-\!} \quad \text{(c)}$$
$$\qquad\ \ \|\qquad\qquad\quad\ \ \|$$
$$\qquad\ \ O\qquad\qquad\quad\ \ O$$

(wherein
W is a residue derived by the elimination of the two hydroxyl groups from a long chain diol (A) having a molecular weight in a range of about 500 to 3,000;
X is a residue derived by the elimination of the two isocyanate groups from an organic isocyanate (C);
Y is a residue derived by the elimination of the two hydroxyl groups from the short chain triol (D) having a molecular weight in a range lower than about 500;
Z is a residue derived by the elimination of the two hydroxyl groups from the short chain diol (B) having a molecular weight in a range of about 50 to 500;
$n_1$ and $n_2$ are each a positive integer; and
$n_3$ is 0 or a positive integer;
said short chain triol (D) being represented by the formula (II):

$$\mathrm{HO\!-\!R_1\!-\!\underset{\underset{R_3\!-\!OH}{|}}{\overset{\overset{R_4}{|}}{C}}\!-\!R_2\!-\!OH}$$

or by formula (III):

$$\mathrm{HO\!-\!R_1\!-\!\underset{\underset{R_3\!-\!OH}{|}}{N}\!-\!R_2\!-\!OH}$$

(wherein
$R_1$ is a group represented by the formula:

$$\mathrm{\!-\!(CH_2)_{\overline{m}}(OCH_2CH_2)_{\overline{n}}\!-\!}$$

(where m and n are each an integer from 0 to 6, provided that, when one of m and n is 0, the other is an integer other than 0);
$R_2$ is a group represented by formula:

$$\mathrm{\!-\!(CH_2)_{\overline{p}}(OCH_2CH_2)_{\overline{q}}\!-\!}$$

(where p and q are each an integer from 0 to 6, provided that, when one of p and q is 0, the other is an integer other than 0);
$R_3$ is a group represented by formula:

$$\mathrm{\!-\!(CH_2)_{\overline{r}}CH\!-\!}$$
$$\qquad\quad\ |$$
$$\qquad\quad\ CH_3$$

(where r is an integer from 0 to 3)
or a group represented by formula:

$$\mathrm{\!-\!(OCH_2\!-\!CH)_{\overline{r}}\!-\!}$$
$$\qquad\quad\ \ |$$
$$\qquad\quad\ \ CH_3$$

(where r has the same meaning as above); and
$R_4$ is a group represented by formula:

$$-C_sH_{2s+1}$$

(where s is an integer from 0 to 4);
obtainable by the polyaddition reaction of the long chain diol (A), the organic diisocyanate (C) and the short chain triol (D) and, as desired, the short chain diol (B) in the ratios of:

$$b/a > 3 \qquad\qquad\qquad\qquad\qquad\qquad (i)$$

$$1 < c/(a+b) < 3 \qquad\qquad\qquad\qquad (ii)$$

$$\tfrac{1}{2} \leq \frac{c-(a+b)}{d} < 1 \qquad\qquad\qquad (iii)$$

(wherein
a is a molar number of the long chain diol (A);
b is a molar number of the short chain diol (B);
c is a molar number of the organic diisocyanate (C); and
d is a molar number of the short chain triol (D)).

Where the short chain triol (D) used is a triol represented by formula (II), the resulting thermoplastic polyurethane resin is a polymer represented by formula (I) in which not less than one hydroxyl group is present in the side chain thereof. Where the short chain triol (D) used is a triol represented by formula (III) in which not less than one hydroxyl group is present in the side chain thereof and at the same time not less than one tertiary amino group is present in the main chain thereof. The units as represented by formulas (a), (b) and (c) may be arranged with a certain regularity or in any random manner.

The long chain diol (A) to be employed for the thermoplastic polyurethane resin in accordance with the present invention has a molecular weight in the range from about 500 to 3,000 and may include, for example, a polyester diol, a polyether diol, a polyether ester glycol and the like.

The polyester diol may include, for example, a polyester diol obtainable by the reaction of an aliphatic dicarboxylic acid such as succinic acid, adipic acid, sebacic acid, azelaic acid or the like; an aromatic dicarboxylic acid such as terephthalic acid, isophthalic acid or the like; a lower alcohol ester, such as methyl or ethyl ester, of the carboxylic acid with a glycol such as ethylene glycol, 1,3-propylene glycol, 1,4-butylene glycol, 1,6-hexane glycol, diethylene glycol, neopentyl glycol or the like, an ethylene oxide adduct of bisphenol A or the like or a mixture thereof and a polyester diol of the lactone type obtained by the cleavage polymerization of a lactone such as ε-caprolactone or the like. The polyether diol may include, for example, a polyalkylene ether glycol such as polyethylene ether glycol, polypropylene ether glycol, polytetramethylene ether glycol or the like, and a polyether glycol obtainable by the copolymerization of these glycols. The polyether ester glycol may include, for example, a polyester ether glycol obtainable by the reaction of the aforesaid polyalkylene ether glycol with an aliphatic or aromatic dicarboxylic acid as hereinabove enumerated as the polyol component.

Where the long chain diol having a too small molecular weight is used, the resulting thermoplastic polyurethane resin will give rise to a decrease in flexibility because the concentration of the urethane groups is rendered too large so that, although ratios thereto of the other components are necessary to be taken into consideration, a solubility of the polyurethane resin in a solvent is rendered generally low to such an extent to which the resin cannot become a solution. Where the long chain diol having a too large molecular weight is used, the concentration of the urethane groups in the resulting polyurethane resin is rendered so small because the content of the long chain diol in the resin becomes too large that an anti-wear property characteristic to the urethane resin is decreased with lack in elastomeric property.

The short chain diol (B) to be optionally used for the thermoplastic polyurethane resin in accordance with the invention has a molecular weight in the range from about 50 to 500 and may include, for example, an aliphatic glycol such as ethylene glycol, propylene glycol, 1,4-butylene glycol, 1,6-hexane glycol, neopentyl glycol or the like or an aromatic diol such as ethylene oxide adduct or propylene oxide adduct of bisphenol A, ethylene oxide adduct of hydroquinone or the like. The short chain diol (B) may be used singly or in admixture with each other. The employment of the short chain diol (B) can provide desired properties on the resulting thermoplastic polyurethane resin to a greater extent when employed in the ratios as specified hereinabove.

The organic diisocyanate (C) to be used for the thermoplastic polyurethane resin in accordance with the invention may include, for example, an aromatic diisocyanate, an aliphatic diisocyanate or an alicyclic diisocyanate such as tolylene diisocyanate, 4,4'-diphenylmethane diisocyanate, paraxylylene diisocyanate, hexamethylene diisocyanate, isophorone diisocyanate or the like. The diisocyanates (C) may be employed singly or in admixture with each other.

The short chain triol (D) to be used for the thermoplastic polyurethane resin in accordance with the present invention has a molecular weight in the range lower than about 500 and, more specifically, may be a compound represented by formula (II) or (III) as set forth hereinabove. Specifically, the triol represented by formula (II) may be enumerated, for example, by the following compounds:

| | |
|---|---|
| HO—CH$_2$—CH(OH)—CH$_2$OH | glycerine |
| HOCH$_2$CH$_2$OCH$_2$—CH(OH)—CH$_2$OCH$_2$CH$_2$OH | ethylene oxide adduct of glycerine |
| HOC$_2$H$_4$OCH$_2$—CH(OH)—CH$_2$OC$_2$H$_4$OC$_2$H$_4$OH | ethylene oxide adduct of glycerine ethylene oxide |
| HOCH$_2$—C(CH$_3$)(OH)—CH$_2$OH | 2-methylpropane-1,2,3-triol |
| (OHC$_2$H$_4$)$_2$=C(CH$_3$)—CH$_2$CH(OH)CH$_3$ | 4-[bis(2-hydroxyethyl)]-2-hydroxypentane |
| (HOC$_2$H$_4$)$_2$=C(OH)—CH$_3$ | 3-methylpentane-1,3,5-triol |
| HOCH$_2$—CH(OH)—C$_3$H$_6$OH | 1,2,6-hexanetriol |

As the triols represented by formula (III), there may be enumerated by the following compounds:

| | |
|---|---|
| (HOC$_2$H$_4$)$_2$=N—CH$_2$—CH(OH)—CH$_3$ | 1-bis(2-hydroxylethyl)-amino-2-propanol (N—isopropanol diethanolamine) |
| (HOC$_2$H$_4$)$_2$=N—CH$_2$CH(CH$_3$)OCH$_2$CH(OH)CH$_3$ | propylene oxide adduct of diethanolamine |
| (HOC$_2$H$_4$OC$_2$H$_4$)$_2$=N—CH$_2$CH(OH)CH$_3$ | ethylene oxide adduct of N—isopropanoldiethanolamine |

It is preferred to use the short chain triol (D) containing at least one tertiary amino group represented by formula (III) because these triols have each two primary hydroxyl groups which are substantially equivalent in reactivity with the isocyanate group and one secondary hydroxyl group which is lower in reactivity therewith. This is because the tertiary amino group has a catalytic action on urethanation so that, where the thermoplastic polyurethane resin is prepared using the triol as hereinabove enumerated as a chain prolonging agent by the prepolymer method as will be described in detail hereinafter, the chain prolongation reaction proceeds advantageously and dispersibility of a pigment, inorganic filler or the like in the resulting polyurethane resin is remarkably improved because both the tertiary amino groups present in the main chain of the polymer and the hydroxyl groups present at positions apart through several carbon atoms therefrom act on the identical particle of the pigment, inorganic filler or the like, whereby adsorbability is enhanced more than where either one of the hydroxyl group and the tertiary amine group is present in the main chain by virtue of a selective adsorbability of the polyurethane resin on the pigment or the like. It is also preferable to use the triol of formula (III) having the tertiary amino group because the tertiary amino group can act as a catalyst for the urethanation reaction where the polyurethane resin is converted into a three-dimensional network structure by adding thereto a curing agent such as a polyisocyanate.

Mention will be made of the method of preparing the thermoplastic polyurethane resin in accordance with the present invention.

The thermoplastic polyurethane resin in accordance with the present invention may be prepared by subjecting the long chain diol (A), the short chain triol (D) and the organic diisocyanate (C) and, optionally, the short chain diol (B) to the polyaddition reaction in ratios as follows:

$$b/a \leq 3 \quad \text{(i)}$$

$$1 < c/(a+b) < 3 \quad \text{(ii)}$$

$$\tfrac{1}{3} \leq [c-(a+b)]/d < 1 \quad \text{(iii)}$$

(wherein a, b and c have each the same meaning as above).

The polyaddition may be carried out by a known method: for example, a one-shot method in which all the components are simultaneously reacted with each other; a prepolymer I method in which a mixture of the long chain diol (A) with the short chain diol (B) is previously reacted with the organic diisocyanate (C) to give a prepolymer having an isocyanate group or isocyanate groups at its terminal or terminals and the short chain triol (D) is added thereto so as to permit chain prolongation and introduction of the hydroxyl group or hydroxyl groups at the side chain thereof; and a prepolymer II method in which the long chain diol (A) is reacted with the organic diisocyanate (C) to give a prepolymer having an isocyanate group or isocyanate groups at the terminal or terminals thereof and the resulting prepolymer is then reacted with a mixture of the short chain diol (B) with the short chain triol (D) so as to permit chain prolongation and introduction of a hydroxyl group or hydroxyl groups into the side chain thereof.

The b/a ratio being equal to and not larger than 3 as indicated by item (i) above means that a molar ratio of the short chain diol (B) to the long chain diol (A) is not greater than 3. Where the b/a ratio is too large, the urethane concentration in the resulting polyurethane resin becomes so high that the resin may be dissolved in a solvent such as ethyl acetate, methyl ethyl ketone, toluene or the like. Accordingly, such polyurethane resin is inappropriate for magnetic tapes and so on. Where a straight chain diol such as ethylene glycol, 1,4-butylene glycol, 1,6-hexane diol or the like is used as the short chain diol, it is preferred to adjust the b/a ratio in the range not larger than 1, more preferably not larger than 0.5. Where a branched chain short chain diol such as neopentyl glycol or ethylene oxide adduct or propylene oxide adduct of bisphenol A is used, a dissolubility of the urethane resin is improved so that the b/a ratio can be rendered higher than the straight chain diol. Where the b/a ratio is much higher than 3, it is not preferred because the dissolubility of the resin is impaired.

The ratio as described in item (ii) above relates to the prepolymer composition having the isocyanate group or isocyanate groups at the terminal or terminals thereof to be prepared by the prepolymer I method and, more specifically, means that the molar ratio of the organic diisocyanate (C) to the sum of the long chain diol (A) and the short chain diol (B) is larger than 1 and smaller than 3. Where the molar ratio is not larger than 1, the short chain triol (D) cannot be introduced owing to the relationship of the ratio (iii) above. Where the molar ratio (ii) above is larger than 3, it is not preferred that what is generally called a free diisocyanate content, that is, the amount of the organic diisocyanate (C) which remains unreacted, is rendered too large due to the high isocyanate concentration in the prepolymer obtainable by the prepolymer I method. This is also undesirable because it becomes extremely difficult to control the chain prolongation reaction for the introduction of the hydroxyl group or hydroxy groups into the side chain thereof because a reaction with the short chain triol proceeds too rapidly due to a great amount of the short chain triol (D). This is further undesirable because a product where network portions and/or insoluble portions are partially formed may result in accordance with reaction conditions. In particular, where the one-shot method is used, a ratio of the secondary hydroxyl groups belonging to the short chain triol to the other hydroxyl groups in the resulting polyurethane resin is rendered so large that the concentration of such secondary hydroxyl groups becomes relatively great and consequently a relative velocity represented by the product of a reaction velocity constant and a concentration of the mixture used therefor is rendered close in accordance with a reaction probability so that the secondary hydroxyl groups of the short chain triol (D) to be introduced into the side chain thereof is also consumed for a reaction with the isocyanate group, whereby polymerization in a straight linear manner is rendered difficult. The ratio is preferably in the range from about 1.02 to 2.5, more preferably from about 1.05 to 2.0.

The ratio (iii) above means that the molar ratio of the prepolymer having a isocyanate group or isocyanate groups at the terminal or terminals thereof prepared previously by the prepolymer I method to the short chain triol (D) to be used as an component for chain prolongation, that is to say, the ratio of the isocyanate group (NCO) present at the both terminals of the prepolymer to the primary hydroxyl groups of the triol, is not smaller than $\tfrac{1}{3}$ and not larger than 1, assuming that the secondary hydroxyl group of the short chain triol (D) is regarded as not involved in the reaction.

In Table 1 below, the hydroxyl group represented by $\gamma = \text{NCO/OH}$, on the one hand, represents the concentration of two hydroxyl groups excluding the secondary hydroxyl group in the short chain triol (D), and the NCO group represented by $\gamma = \text{NCO/OH}$, on the other hand, represents the concentration of the isocyanate groups at the both terminals of the prepolymer prepared by the prepolymer I method. That is to say, the following relationship can be given:

$$\gamma = \frac{c - (a+b)}{d} = \text{NCO/OH}.$$

TABLE 1

Relationship of $\gamma$ with Structure of Polyurethane Resin (Prepolymer I method)

| $\gamma$ | P(*) | n(**) |
|---|---|---|
| 0.50 | 1 | 2 |
| $\tfrac{2}{3}$ (= 0.667) | 2 | 3 |
| 0.75 | 3 | 4 |
| 0.80 | 4 | 5 |
| 0.90 | 9 | 10 |
| 0.95 | 19 | 20 |
| 0.99 | 99 | 100 |

(*)P = $\gamma/(1-\gamma)$
(**)n = number of side chain OH groups

From Table 1 above, $\gamma = 0.5$ means that the resulting polyurethane resin results from a prepolymer having one triol at the both terminals thereof and possesses a hydroxyl group at each of the terminals thereof and a hydroxyl group or hydroxyl groups at the side chain or chains thereof, that is, the side chain hydroxyl groups. Preferably, $\gamma$ is in a range not smaller than $\tfrac{2}{3}$, and a side chain hydroxyl group or groups is or are introduced into the middle portion of the molecular chain so that the crosslinking is effected even at the middle portion thereof rather than the crosslinking merely at the terminals, in instances where it is cured with a curing agent, whereby heat resistance and solvent resistance are increased to a remarkably high extent. More preferably, γ is in a range from 0.80 to 0.99, and not fewer than five side chain hydroxyl groups are introduced therein. Where γ, that is, the ratio (iii) above, is larger than 1, even the secondary hydroxyl group of the short chain triol is also used to allow a reaction so that the resulting polymer gels and cannot provide a linear polymer. Accordingly, it is necessary that the ratio (iii) above is in the range smaller than 1.

In accordance with the present invention, the molecular weight of the thermoplastic polyurethane resin necessary to provide properties and effects to be sought to be accomplished may be in a range larger than about 5,000, preferably larger than about 9,000, although it varies with the structure thereof, Where the resulting thermoplastic polyurethane resin has a too small molecular weight, the physical properties become too brittle and the breaking strength thereof is so low that elongation becomes low.

There are ranges of optimum concentrations of the side chain hydroxyl groups and the tertiary amino groups in the resin. Where the optimum concentrations are over the upper limits, the liquid properties of a dispersion is so thixotropic that workability is impaired where a pigment or the like is a vehicle component for a binder in which it is dispersed. Conversely, where the concentrations are below the lower limits, the hydrophilic groups to be adsorbed are rendered too small so that dispersibility becomes as poor as conventional thermoplastic polyurethane resins and a crosslinking density is so low, where it is crosslinked with a curing agent such as polyisocyanate, that a sufficient effect resulting from the crosslinking cannot be given. It is preferred that the concentration ranges be in a range generally from about 0.01 to 1.0 mmol/gram, although they are dependent upon uses and requirement performance.

Processes for the polyaddition reaction to be used for the present invention may include, for example, a melt polymerization in which the reaction is carried out in a molten state and a solution polymerization in which the reaction is carried out in a solution of the raw materials as referred to hereinabove in an inert solvent such as ethyl acetate, methyl ethyl ketone, acetone, toluene or the like or a mixture thereof. For the manufacture of the thermoplastic polyurethane resins in accordance with the present invention which are employed in a solution in a solvent in many cases, the solution polymerization is preferred. It is particularly preferred that the melt polymerization is carried out during the preparation of the prepolymer and, prior to the chain prolongation reaction, the solution polymerization of the prepolymers is carried out in a solution thereof in the inert solvent.

In the reaction for the preparation of the thermoplastic polyurethane resin in accordance with the present invention, an organometallic compound such as an organotin compound, e.g., stannous octylate, dibutyl tin dilaurate or the like or a tertiary amine, e.g., N-methylmorpholine, triethylamine or the like may be added as a catalyst. In order to increase the stability of a product, an antioxidant, a ultraviolet ray absorbing agent, a hydrolysis preventive agent or the like may be added in an amount of about 5% or less with respect to solids.

The present invention will be described more in detail by way of examples.

EXAMPLE 1

A 5,000-ml reaction vessel equipped with a stirring propeller, a thermometer and a condenser was charged with 1,000 grams (0.5 mole) of ethylene adipate having a molecular weight of 2,000 and 217.5 grams (1.25 moles) of tolylene diisocyanate ("T-80"; manufactured and solid by Nippon Polyurethane Kogyo K.K.), and the mixture was reacted at 80° to 90° C. for 3 hours. To the mixture were then added 1,200 grams of methyl ethyl ketone, 900 grams of toluene and 71.4 grams (0.78 mole) of glycerine and 0.1 gram of dibutyltin dilaurate, and the chain prolongation was effected at 60° to 70° C. To the reaction mixture was added 290 grams of methyl ethyl ketone to give a polyurethane resin solution having a 35% solids, a viscosity of 17,600 cp/25° C. and an OH value of 0.60 mmol/gram.

EXAMPLE 2

To a mixture of 1,250 grams (1.00 mole) of polycaprolactone diol having a molecular weight of 1,250 and 104.2 grams (1.00 mole) of neopentyl glycol were added 571 grams (2.28 moles) of 4,4'-diphenylmethane diisocyanate and 1,040 grams of toluene, and the mixture was reacted at 80° to 90° C. for 4 hours. After 1,000 grams of methyl ethyl ketone and 36.8 grams (0.40 mole) of glycerine were added thereto, the reaction was carried out at 70° C., and 1,600 grams of methyl ethyl ketone was further added to give a solution containing a 35% solids content. The polyurethane resin solution had a viscosity of 10,000 cp/25° C. and an OH value of 0.20 mmol/gram.

EXAMPLE 3

A mixture of 1,000 grams (0.50 mole) of polycaprolactone diol having a molecular weight of 2,000, 90 grams (0.10 mole) of 1,4-butylene glycol, 146.2 grams (0.87 mole) of 1,6-hexamethylene diisocyanate, 824 grams of toluene and 0.1 gram of a urethanation catalyst was reacted at 90°–95° C. for 3 hours. After 824 grams of methyl ethyl ketone and 27.6 grams (0.30 mole) of glycerine were added thereto, the mixture was then reacted at 70°–80° C., and 550 grams of methyl ethyl ketone was further added. The resulting polyurethane resin solution had a 35% solids content, a viscosity of 12,000 cp/25° C., a number average molecular weight of 60,000, a weight average molecular weight of 140,000 and an OH value of 0.25 mmol/gram.

EXAMPLE 4

There were charged 1,000 grams (0.50 mole) of butylene adipate having a molecular weight of 2,000 and 250.3 grams (1.00 mole) of 4,4'-diphenylmethane diisocyanate into a reaction vessel as used in Example 1, and the mixture was reacted at 80°–90° C. for 3 hours. After 1,335 grams of methyl ethyl ketone, 84.8 grams (0.52 mole) of N-isopropanol diethanolamine and 0.1 gram of dibutyltin dilaurate as a urethanating catalyst were added thereto, the mixture was reacted at 60°–70° C. followed by the addition of 1,145 grams of methyl ethyl ketone to give a polyurethane resin solution having a 35% solids content, a viscosity of 26,000 cp/25° C., and OH value of 0.39 mmol/gram and a tertiary amino group content of 0.39 mmol/gram.

EXAMPLE 5

The procedures of Example 4 were followed with the exception that 1,250 grams of hexane adipate having a molecular weight of 2,500, 243.6 grams (1.45 moles) of 1,6-hexamethylene diisocyanate and 192.4 grams (1.18 moles) of N-isopropanol diethanolamine were used to give a polyurethane resin solution having a viscosity of 5,400 cp/25° C., a number average molecular weight of 50,000, a weight average molecular weight of 90,000, an OH value of 0.76 mmol/gram and a tertiary amino group content of 0.76 mmol/gram.

EXAMPLES 6 AND 7

The procedures of Example 4 were followed by varying the composition of the raw materials to give a polyurethane resin solution having the following OH values:

TABLE 2

| Example | OH values (mmol/gram) |
| --- | --- |
| 6 | 0.20 |
| 7 | 0.04 |

EXAMPLES 8 THROUGH 11

The polyurethane resin solutions having the compositions as indicated in Table 3 below were prepared in the same manner as in Example 4.

TABLE 3

| | Molar Ratios of Raw Materials | | | | Properties | | |
| --- | --- | --- | --- | --- | --- | --- | --- |
| | Long chain diol (A) | Short chain diol (B) | Organic diisocyanate (C) | Short chain triol (D) | Solids (%) | Viscosity (cp/25° C.) | Solvent (cp/25° C.) | OH value Ratio (wt.) |
| Example 8 | DEA-25000 1.00 mole | 1.4-BG 0.50 mole | MDI 2.00 moles | Glycerine 0.51 mole | 30 | 56000 | $\frac{T}{M} = \frac{20}{80}$ | 0.16 |
| Example 9 | BA-2000 1.00 mole | — | HDI 1.30 moles | Glycerine 0.33 mole | 30 | 9400 | $\frac{T}{M} = \frac{25}{75}$ | 0.15 |
| Example 10 | BA-2400 1.00 mole | 1.4-BG 0.21 mole | HDI 1.50 moles | Glycerine 0.33 mole | 30 | 11000 | $\frac{T}{M} = \frac{30}{70}$ | 0.11 |
| Example 11 | BA-1000 1.00 mole | — | T-80 1.30 moles | Glycerine 0.35 mole | 35 | 11000 | M | 0.28 |

DEA: Dibutylene adipate
BA: Butylene adipate
1.4-BG: 1,4-Butylene glycol
MDI: 4,4'-Diphenylmethane diisocyanate
HDI: 1,6-Hexamethylene diisocyanate
T-80: Tolylene diisocyanate (2.4-/2.6-isomers = 80/20)
T: Tolune
M: Methyl ethyl ketone

COMPARATIVE EXAMPLE 1

The procedures of Example 4 were followed with the exception that, in placae of N-isopropanol diethanolamine used therein, 4,4'-diphenylmethane diisocyanate was used to give a polyurethane resin solution having a 35% solids content, a viscosity of 9,000 cp/25° C., a number average molecular weight of 50,000 and a weight average molecular weight of 105,000.

COMPARATIVE EXAMPLE 2

The procedures of Example 2 were followed with the exception that, in place of glycerine, a mixture of 0.50 mole of polycaprolactone diol having a molecular weight of 1,250, 0.50 mole of neopentyl glycol and 4,4'-diphenylmethane diisocyanate was used to give a polyurethane resin solution having a 35% solids content and a viscosity of 15,000 cp/25° C.

COMPARATIVE EXAMPLE 3

The procedures of Example 10 were followed with the exception that, in place of glycerine, a mixture of butylene adipate having a molecular weight of 2,400, 1,4-butylene glycol and 1,6-hexamethylene diisocyanate was used to give a polyurethane resin solution having a 30% solids content and a viscosity of 15,000 cp/25° C.

COMPARATIVE EXAMPLE 4

Example 9 was followed with the exception that there was prepared without the use of glycerine to give a polyurethane resin solution having a 30% solids content and a viscosity of 12,000 cp/25° C.

EVALUATION OF DISPERSIBILITY

The polyurethane resin in accordance with the present invention is superior in dispersibility of a compound having a hydrophilic surface, such as an inorganic filler, a pigment or the like.

As methods of evaluating the dispersibility, sedimentation tests and measurement of an adsorption amount using gamma-$Fe_2O_3$ as a pigment have been made.

(1) Tests on Sedimentation:

1.0 gram of gamma-$Fe_2O_3$ and 0.25 gram of a polyurethane resin to be tested were charged into a 50 ml graduated measuring cylinder with a stopper and adjusted with a mixed solvent (methyl ethyl ketone/toluene/cyclohexane=2/2/1 (weight ratio)) to give 50.0 ml of a solution. The solution was then mixed for 5 minutes with ultrasonic waves and the mixture was stirred 100 times. After the mixture was allowed to settle down for 24 hours, the mixture was again mixed with ultrasonic waves for 5 minutes and the stirring was carried out 100 times. After the mixture was allowed to stand, observation of a sedimentation state was made. The sedimentation volume was expressed in % by weight as a final sedimentation volume at the time of equilibrium.

(2) Measurement for Adsorption Amount:

15.0 grams of gamma-$Fe_2O_3$ was dispersed in a solution of 3.0 grams of a polyurethane resin to be tested in 50 grams of methyl ethyl ketone, and the dispersion was stirred for 20 hours. Thereafter, the solution was centrifuged to give a supernatant. The amount of the polyurethane resin contained therein was determined by a comparison with a standard line previously prepared. The amount of adsorption was calculated from the following formula in mg per grams of gamma-$Fe_2O_3$:

$$200 - \frac{\text{Polyurethane Resin Amount in Supernatant (mg)}}{15}$$

The results are shown in Table 4 below.

TABLE 4

| | Concentration of Functional Groups | | Sedimentation Test | | | Adsorption Test Amount of Adsorption |
|---|---|---|---|---|---|---|
| | OH (mmol/g) | N (mmol/g) | Sedimentation Volume (%) | Sedimentation Velocity(*) (relative value) | State of Precipitation | (mg/g, $\gamma$-$Fe_2O_3$) |
| Example 5 | 0.76 | 0.76 | 5.8 | FF | Dick | 63 |
| Example 4 | 0.39 | 0.39 | 5.8 | F | Dick | 102 |
| Example 6 | 0.20 | 0.20 | 6.0 | S | Dick | 90 |
| Example 7 | 0.04 | 0.04 | 6.6 | S | Dick | 77 |
| Example 11 | 0.28 | — | 6.5 | S | Dick | 60 |
| Example 2 | 0.20 | — | 8.8 | FF | Fair | 58 |
| Comparative Example 1 | — | — | 15.0 | F | Fair | 33 |
| Comparative Example 2 | — | — | 20.0 | F | Coarse | 25 |

(*)Sedimentation velocity: (faster)FF > F > S(slow)

As shown in Table 4, the thermoplastic polyurethane resin in accordance with the present invention having the side chain hydroxyl groups or having both the side chain hydroxyl groups and the tertiary amino groups has an adsorption amount more than two times as much as those produced in Comparative Examples. The polyurethane resin of the present invention has a smaller sedimentation volume than those obtained in Comparative Examples because the pigment particles including even primary particles are dispersed, so that dispersibility is improved to a remarkably great extent.

A comparison of Example 2 with Examples 6 and 7 indicates that, where both the side chain hydroxyl groups and the tertiary amino groups are contained rather than where the side chain hydroxyl groups alone are contained in the resin, particularly superior dispersibility is accomplished.

The resins obtained in Examples 4, 6 and 7 and in Comparative Example 1 are of the series having the same composition and merely different concentrations of the side chain hydroxyl groups and the tertiary amino groups. The sedimentation volume is rendered smaller with an increase in the concentration of the functional groups because dispersibility becomes good and it reaches almost equilibrium. The adsorption amounts of the resin becomes an curved line indicating the maximum value shown in Example 4. This is because the thermoplastic polyurethane resin of the invention will adsorb on hydrophilic surfaces of the pigment or the like through the side chain hydroxyl groups and the tertiary amino groups thereof and because even the primary particles of the pigment are dispersed in the resin. A vehicle component once dispersed is rendered stable because pigment particles dispersed adsorb on the resin, like a soap, in a state such that a lipophilic portion of the polyurethane resin such as a soft segment portion following methylene chains is exposed in order to prevent other pigment particles from coming closer.

Since the side chain hydroxyl groups and the tertiary amino groups required for dispersion may be in the lowest amount required for adsorption of the thermoplastic polyurethane resin on a pigment, inorganic filler or the like, from a few to several tens of the side chain hydroxyl groups and the tertiary amino groups in one polymer chain may be sufficient. Where the functional groups are introduced in one polymer to such an extent to which it is more than necessary, the polymer chain adsorbed on one pigment particle is also adsorbed on other particles through the other functional groups so that the polymer crosslinks the pigment particles. This causes the pigment particles to become in a coagulated state so that they become readily to sediment and the amount of adsorption is rendered smaller, although an apparent sedimentation volume is small, and the actual dispersibility is impaired. Where the polymer chain crosslinks the pigment particle, a solution of the resin shows a thixotropic property so that concentrations of the side chain hydroxyl groups and the tertiary amino groups have optimum ranges.

EVALUATION OF COMPATIBILITY

The thermoplastic polyurethane resin of the invention is well compatible with resins containing a hydrophilic group such as hydroxyl group because it contains the side chain hydroxyl groups or both the side chain hydroxyl groups and the tertiary amino groups.

(1) Tests on Compatibility

A polyurethane resin of the present invention was mixed with another resin in a weight ratio of 1:1 and the mixture was diluted with methyl ethyl ketone so as to amount to a 20% solids content. After the mixture was well shaked and then allowed to stand, observation was made after 40 hours on its liquid state. The results are shown in Table 5 below.

(2) Compatibility assessment (Softening point)

Each of the resins prepared in Examples 3 and 6 and Comparative Example 1 was blended with vinyl chloride-vinyl acetate-vinyl alcohol copolymer ("VAGH"; manufactured by Union Carbide Corp.) in varying ratios to give a methyl ethyl ketone/toluene solution and then formed into a film having a thickness of 100 microns. The film was cut with a JIS 2 dumbbell, and the resulting sample specimen was heated at a rate of 5° C. per minute under a load of 5 grams per 100 microns until the film was broken or it was extended by 10%. The temperature at which the film reached the involved situation is determined to be the softening point.

The FIGURE shows the instances where the polyurethane resins obtained in Examples 3 and 6 and in Comparative Example 1 were tested.

Where the resin has a good compatibility, the drawing indicates that its softening points vary continuously in proportion to ratios in which it was blended. Where compatibility of the resin was poor, it was found that the softening point of the tested resin was brought rapidly close to the softening point of the component that was contained in a greater amount. It is apparent from the drawing that the thermoplastic polyurethane resin in accordance with the present invention has favorable compatibility.

EVALUATION ON CURABILITY AND CROSSLINKABILITY

The thermoplastic polyurethane resin in accordance with the present invention has the characteristic that it is crosslinked with a curing agent reactive with a hydroxyl group, such as polyisocyanate, methylolated melamine, an acid anhydride or the like because the resin has side chain hydroxyl groups. The amount of the curing agent is preferably in a range from about 0.5 to 2.0 mol% with respect to the side chain hydroxyl groups of the resin and from about 1 to 50 parts by weight based on 100 parts by weight of the resin according to the invention although the amount thereof may vary with the kind of the curing agent used and the composition of the resin used. Table 6 below illustrates physical properties where a polyisocyanate ("Coronate L"; manufactured by Nippon Polyurethane Industry Co., Ltd.; NCO=13%; solids=75%) was added. The amount of the isocyanate is based on 100 parts by weight on the solid basis.

APPLICATION TO ADHESIVES

A solution of a conventional highly crystalline thermoplastic polyurethane resin having a terminal hydroxyl group or groups has been extensively used for an adhesive for a vinyl chloride plastic, urethane sheet or the like. The conventional resin, however, has the drawback that, as an aromatic diisocyanate such as 4,4'-diphenylmethane diisocyanate, tolylene diisocyanate or the like is used mainly as a diisocyanate, a portion where the adhesive oozed out turns yellow. In order to avoid such drawback, an aliphatic diisocyanate has been used to give an adhesive. In this case, an aliphatic diisocyanate can provide a sufficient adhesiveness and initial adhesion at ambient temperature when compared to the aromatic diisocyanate, while it has the drawback that an adhesion at high temperatures is not satisfactory.

(a) Method of Adhering:

The resin obtained in the Examples and in the Comparative Example as referred to in Table 7 below was dissolved in a suitable solvent such as methyl ethyl ketone, toluene, acetone or the like to give a solution having a viscosity in the range from 2,000 to 5,000 cp/25° C. The solution was coated on a sheet (4 mm dick plasticizable vinyl chloride containing 30% DOP)

TABLE 5

| | | Compatibility | | | |
|---|---|---|---|---|---|
| Polyester diol "N-4042" Nippon Polyurethane Industry Co., Ltd. | Polyether diol "PPG-2000" Sanyo Kasei Industries Co., Ltd. | Epoxy Resin "E-1001" Shell Oil Co. | Polyester Resin "V-300" Toyoboseki Co. | Vinyl-Chloride Vinyl Acetate Resin "VAGH" UCC Co. | Phenolic Resin "CKM-5254" Showa Union Gosei Co., Ltd. |
| Example 5 | | | | | |
| Very Good | Very Good | Very Good | Very Good | Very Good | Very Good |
| Comparative Example 2 | | | | | |
| Good | Poor | Very Good | Good | Good | Good |

Ratings:
Very Good: Liquid transparent and completely compatible
Good: Slightly cloudy over a whole area
Fair: Partially floating materials formed
Poor: Separated into two phases to give a film having a dry thickness of 50 microns at room temperature. The coating was dried for 10 minutes with flowing air and heated at 60°-70° C. for 1

TABLE 6

| | Amount of Polyisocyanate (Parts by weight) | Evaluation of Curability | | | Softening Point[2] (°C.) | Solvent Resistance[3] |
|---|---|---|---|---|---|---|
| | | Tensile Properties[1] | | | | |
| | | 100% Modulus (kg/cm²) | $T_B$ | $E_B$ (%) | | |
| Example 3 | 0 | 63 | >114 | >800 | 51 | Poor |
| | 5 | 138 | 252 | 160 | 217 | Very Good |
| | 20 | 241 | 281 | 110 | 220 | Very Good |
| Example 6 | 0 | 82 | 430 | 1000 | 49 | Poor |
| | 10 | 92 | 542 | 520 | 220 | Very Good |
| | 20 | 127 | 460 | 360 | 222 | Very Good |
| Comparative Example 1 | 0 | 87 | 243 | >880 | 46 | Poor |
| | 14 | 139 | 471 | 500 | 193 | Fair |
| | 28 | 216 | 470 | 360 | 203 | Good |
| Comparative Example 2 | 0 | 7 | >3 | >1200 | 43 | Poor |
| | 5 | 15 | 330 | 600 | 181 | Fair |
| | 20 | 49 | 514 | 380 | 202 | Good |

Curing Conditions: 25° C. for 30 minutes, 80° C. for 15 minutes, 110° for 15 minutes, then 25° C. for 7 days
Tensile strength[1]: 25 mm slip having a thickness of 100 microns; velocity, 100 mm/minute
Softening point[2]: The softening point is determined as a temperature at which, when a film was cut with a JIS 2 dumbbell so as to have a thickness of 100 microns and was heated at a rate of 5° C. per minute under a load of 5 grams until the film is broken or extends by 10%.
Solvent resistance[3]: The solvent resistance was determined from an extent of gloss on the surface of the film or damage by rubbing the film surface with a gauze immersed with methyl ethyl ketone and the solvent resistance was rated as follows:
Poor: Gloss disappeared with 1 to 10 rubbings and portion was dissolved.
Fair: Gloss disappeared with 11 to 50 rubbings.
Good: Gloss disappeared with 51 to 100 rubbings.
Very Good: No surface gloss varied even with more than 100 rubbings.

minute. Immediately thereafter, the coatings were attached to each other under pressures through rubber rolls. In this case, a diisocyanate ("Coronate HL"; Nippon Polyurethane Industry CO., Ltd.) was used as a curing agent.

TABLE 7

| Adhesive | Amount of Curing Agent | Periodical Adhesion — Initial Adhesion | Periodical Adhesion — Adhesion | Heat Resistance (°C.) |
|---|---|---|---|---|
| Example 7 | 0 | 11.6 | 13.0 | 64 |
|  | 5 | 5.4 | 13.0 | Over 135 |
| Example 9 | 0 | 0.8 | 4.0 | 40 |
|  | 5 | 6.4 | 10.0 | Over 135 |
| Comparative Example 4 | 0 | 4.0 | 6.0 | 66 |
|  | 5 | 3.9 | 7.0 | 113 |
| Example 10 | 0 | 2.0 | 2.0 | 60 |
|  | 5 | 7.6 | 20.0 | Over 120 |
| Comparative Example 3 | 0 | 14.0 | 20.0 | 60 |
|  | 5 | 0.8 | 12.0 | 104 |

Initial adhesion/Adhesion(kg/25mm): JIS K-6854; Peeling-off strength at a 180° angle and a velocity of 100mm/minute using a 25mm wide/100mm long specimen. Heat resistance: JIS K-6844

It is apparent from Table 7 that the polyurethane resin according to the present invention, when crosslinked with the diisocyanate, can provide a favorable heat resistance and initial adhesion.

It was found that the polyurethane resin obtained in Example 7 can be used for a one-can type adhesive and for a two-pack type adhesive and that the resin obtained in Example 10 can permit an adhesive for a plasticizable vinyl chloride as a two-pack type adhesive.

What is claimed is:

1. A thermoplastic polyurethane resin having a molecular weight larger than 5,000 and comprising a combination of units represented by the following formulas:

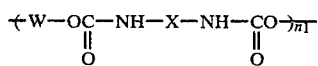  (a)

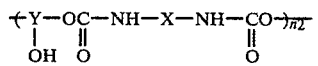  (b)

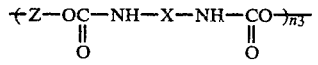  (c)

(wherein
W is a residue derived by the elimination of the two hydroxyl groups from a long chain diol (A) having a molecular weight in a range of about 500 to 3,000;
X is a residue derived by the elimination of the two isocyanate groups from an organic isocyanate (C);
Y is a residue derived by the elimination of the two hydroxyl groups from a short chain triol (D) having a molecular weight in a range lower than about 500;
Z is a residue derived by the elimination of the two hydroxyl groups from a short chain diol (B) having a molecular weight in a range of about 50 to 500;
$n_1$ and $n_2$ are each a positive integer; and
$n_3$ is 0 or a positive integer;
said short chain triol (D) being represented by the formula (II):

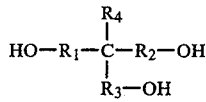

or by the formula (III):

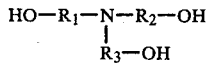

(wherein
$R_1$ is a group represented by the formula:

(where m and n are each an integer from 0 to 6, provided that, when one of m and n is 0, the other is an integer other than 0);
$R_2$ is a group represented by the formula:

(where p and q are each an integer from 0 to 6, provided that, when one of p and q is 0, the other is an integer other than 0);
$R_3$ is a group represented by formula:

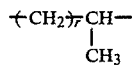

(where r is an integer from 0 to 3) or a group represented by formula:

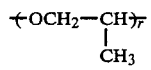

(where r has the same meaning as above); and
$R_4$ is a group represented by formula:

(where s is an integer from 0 to 4);
obtainable by the polyaddition reaction of the long chain diol (A), the organic diisocyanate (C) and the short chain triol (D) and, as desired, the short chain diol (B) in the ratios of:

$$b/a \leqq 3 \qquad \text{(i)}$$

$$1 < c/(a+b) < 3 \qquad \text{(ii)}$$

$$\tfrac{1}{2} \leqq \frac{c - (a + b)}{d} < 1 \qquad \text{(iii)}$$

(wherein
a is a molar number of the long chain diol (A);
b is a molar number of the short chain diol (B);
c is a molar number of the organic diisocyanate (C); and
d is a molar number of the short chain triol (D)).

2. The thermoplastic polyurethane resin according to claim 1, wherein the long chain diol (A) is a polyester diol, a polyether diol or a polyether ester glycol.

3. The thermoplastic polyurethane resin according to claim 2, wherein the polyester diol is obtained by the reaction of an aliphatic dicarboxylic and, an aromatic dicarboxylic acid or a lower alcohol ester of the dicarboxylic acid with a glycol.

4. The thermoplastic polyurethane resin according to claim 3, wherein the aliphatic dicarboxylic acid is succinic acid, adipic acid, sebacic acid or azelaic acid.

5. The thermoplastic polyurethane resin according to claim 3, wherein the aromatic dicarboxylic acid is terephthalic acid or isophthalic acid.

6. The thermoplastic polyurethane resin according to claim 3, wherein the lower alcohol ester is a methyl or ethyl ester.

7. The thermoplastic polyurethane resin according to claim 3, wherein the glycol is ethylene glycol, 1,3-propylene glycol, 1,4-butylene glycol, 1,6-hexane glycol, diethylene glycol, neopentyl glycol, an ethylene oxide or propylene oxide adduct of bisphenol A.

8. The thermoplastic polyurethane resin according to claim 3, wherein the polyester diol is obtained by the cleavage polymerization of a lactone.

9. The thermoplastic polyurethane resin according to claim 8, wherein the lactone is $\epsilon$-caprolactone.

10. The thermoplastic polyurethane resin according to claim 2, wherein the polyether diol is a polyether glycol.

11. The thermoplastic polyurethane resin according to claim 10, wherein the polyether glycol is polyethylene ether glycol, polypropylene ether glycol or polytetramethylene ether glycol.

12. The thermoplastic polyurethane resin according to claim 2, wherein the polyether ester glycol is a polyester glycol obtained by the reaction of a polyalkylene ether glycol with an aliphatic dicarboxylic acid or an aromatic dicarboxylic acid.

13. The thermoplastic polyurethane resin according to claim 12, wherein the polyalkylene ether glycol is a polyethylene glycol, polypropylene ether glycol or polytetramethylene ether glycol.

14. The thermoplastic polyurethane resin according to claim 12, where the aliphatic acid is succinic acid, adipic acid sebacic acid or azelaic acid.

15. The thermoplastic polyurethane resin according to claim 12, wherein the aromatic acid is terephthalic acid or isophthalic acid.

16. The thermoplastic polyurethane resin according to claim 1, where the short chain diol (B) is an aliphatic glycol or an aromatic diol.

17. The thermoplastic polyurethane resin according to claim 16, wherein the aliphatic glycol is ethylene glycol, propylene glycol, 1,4-butylene glycol, 1,6-hexane glycol or neopentyl glycol.

18. The thermoplastic polyurethane resin according to claim 16, wherein the aromatic glycol is an ethylene oxide or propylene oxide adduct of bisphenol A or ethylene oxide adduct of hydroquinone.

19. The thermoplastic polyurethane resin according to claim 1, wherein the organic diisocyanate (C) is an aromatic diisocyanate, an aliphatic diisocyanate or an alicyclic diisocyanate.

20. The thermoplastic polyurethane resin according to claim 19, wherein the organic diisocyanate (C) is tolylene diisocyanate, 4,4'-diphenylmethane diisocyanate, para-xylene diisocyanate hexamethylene diisocyanate, or isophorone diisocyanate.

21. The thermoplastic polyurethane resin according to claim 1, wherein the short chain triol of the formula (II) is glycerine, ethylene oxide adduct of glycerine, ethylene oxide adduct of glycerine ethylene oxide adduct, 4-bis[(2-hydroxyethyl)]-2-hydroxypentane, 3-methylpentane-1,3,5-triol or 1,2,6-hexane triol.

22. The thermoplastic polyurethane resin according to claim 1, wherein the short chain triol of the formula (III) is 1-bis-(2-hydroxylethyl)amino-2-propanol, propylene oxide adduct of diethanol amine or ethylene oxide adduct of N-isopropanol diethanolamine.

* * * * *